(12) United States Patent
Zhang et al.

(10) Patent No.: US 7,547,652 B2
(45) Date of Patent: Jun. 16, 2009

(54) VITREOUS COMPOSITIONS OF THE VITROCERAMIC TYPE, TRANSPARENT TO INFRARED

(75) Inventors: Xianghua Zhang, Cesson-Sevigne (FR); Jacques Lucas, Betton (FR); Hongli Ma, Cesson-Sevigne (FR); Jean-Luc Adam, Rennes (FR)

(73) Assignees: Centre National De La Recherche Scientifique, Paris (FR); Universite Rennes 1, Rennes (FR)

( * ) Notice: Subject to any disclaimer, the term of this patent is extended or adjusted under 35 U.S.C. 154(b) by 0 days.

(21) Appl. No.: 10/562,728

(22) PCT Filed: Jul. 5, 2004

(86) PCT No.: PCT/FR2004/050311

§ 371 (c)(1),
(2), (4) Date: Apr. 3, 2006

(87) PCT Pub. No.: WO2005/005334

PCT Pub. Date: Jan. 20, 2005

(65) Prior Publication Data

US 2006/0223688 A1   Oct. 5, 2006

(30) Foreign Application Priority Data

Jul. 7, 2003   (FR) .................................. 03 08298

(51) Int. Cl.
*C03C 3/32* (2006.01)
(52) U.S. Cl. ..................... 501/40; 501/37; 501/904; 501/42; 501/104; 501/140; 501/43; 501/32; 501/3; 501/10; 385/142; 385/144
(58) Field of Classification Search .............. 501/40, 501/37, 42, 43, 32, 904, 104, 140, 3, 10
See application file for complete search history.

(56) References Cited

U.S. PATENT DOCUMENTS

| | | | | |
|---|---|---|---|---|
| 4,704,371 A * | 11/1987 | Krolla et al. | ................... | 501/40 |
| 4,835,121 A | 5/1989 | Shibuya et al. | | |
| 4,973,345 A * | 11/1990 | France | ........................ | 65/389 |
| 5,389,584 A * | 2/1995 | Aitken et al. | ................... | 501/40 |
| 5,392,376 A * | 2/1995 | Aitken et al. | ................. | 385/144 |
| 5,958,545 A * | 9/1999 | Kuo et al. | ................. | 428/846.9 |
| 6,128,429 A * | 10/2000 | Cole et al. | ................... | 385/142 |
| 7,143,609 B2 * | 12/2006 | Aitken et al. | ................... | 65/26 |

(Continued)

OTHER PUBLICATIONS

Ma et al; "Ga-Ge-Sb-Se based glasses and influence of alkaline halide addition"; Journal of Non-Crystalline Solids; vol. 256&257; 1999; pp. 165-169; XP002274089.

*Primary Examiner*—Jerry Lorengo
*Assistant Examiner*—Pegah Parvini
(74) *Attorney, Agent, or Firm*—Oliff & Berridge, PLC

(57) ABSTRACT

The invention relates to vitreous compositions, in particular of the vitroceramic type, transparent to infrared, production and uses thereof. Said compositions comprise in mol. %: Ge 5-40, Ga<1, S+Se 40-85, Sb+As 4-40, MX 2-25, Ln 0-6, adjuncts 0-30, where M=at least one alkaline metal, selected from Rb, Cs, Na, K and Zn, X=at least one atom of chlorine, bromine or iodine, Ln=at least one rare earth and adjunct=at least one additive comprising at least one metal and/or at least one metal salt with the sum of all molar percentages of the components present in said composition being 100.

25 Claims, 1 Drawing Sheet

U.S. PATENT DOCUMENTS

2002/0022564 A1   2/2002  Minamikawa et al.
2003/0104918 A1*  6/2003  Aitken ........................ 501/42
2004/0079114 A1*  4/2004  Aitken et al. ................... 65/64

* cited by examiner

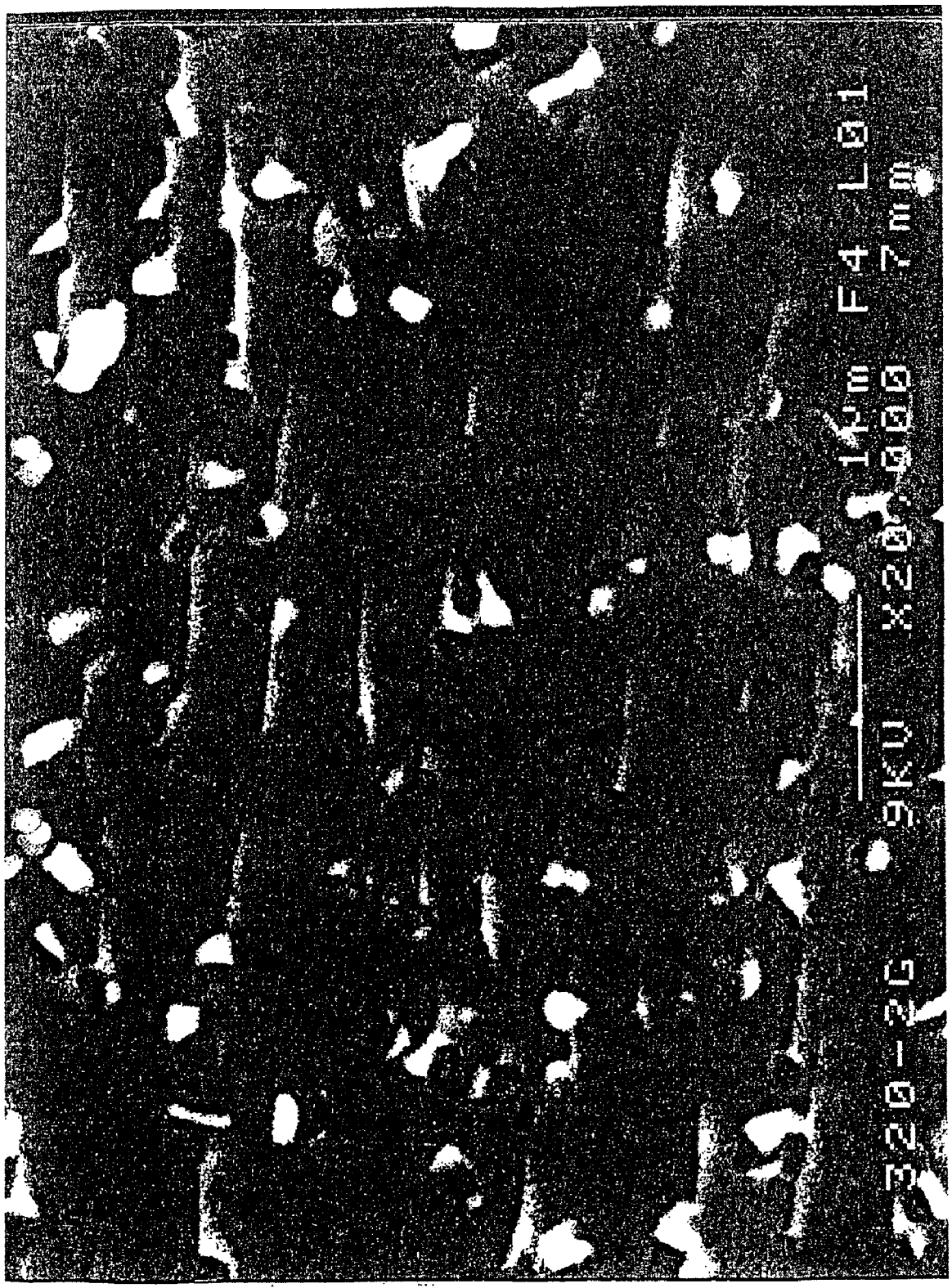

VITREOUS COMPOSITIONS OF THE VITROCERAMIC TYPE, TRANSPARENT TO INFRARED

A subject matter of the invention is vitreous compositions, in particular of vitroceramic type, which are transparent in the infrared, their processes of preparation and their uses.

More specifically, the present invention is targeted at providing a material capable of ensuring the transmission of infrared radiation, that is to say having a transparency in the wavelengths extending from 0.7 to 14 μm and in particular extending from 0.7 to 11 μm or from 0.9 to 14 μm. Such materials are used in the field of thermal imaging and in particular for the manufacture of optical components for infrared systems, such as, for example, thermal imagers.

Monocrystalline germanium currently composes the majority of the optics of infrared cameras. Unfortunately, it is a rare and expensive material, the forming of which is lengthy and expensive.

More recently, glasses transparent in the infrared have been proposed as an alternative to monocrystalline germanium. Mention may be made, as representative of these transparent glasses, of chalcogenide glasses, in particular vitreous compositions based on gallium, on germanium and on antimony, and more particularly those disclosed in patent EP 1 034 145. However, although satisfactory in terms of transparency in the infrared and of cost, such glasses generally have a limited resistance to mechanical impacts and thermal shocks.

Furthermore, it is known to obtain, from certain glasses, materials of vitroceramic type which combine advantages of ceramics (high hardness, good mechanical properties, low thermal expansion) and advantages of glasses (ease of manufacture, forming). These materials are obtained as the result of a heat treatment of certain vitreous compositions, so as to bring about their partial crystallization. Thus, vitroceramics based on oxides, the main constituents of which are generally $SiO_2$ and/or $Al_2O_3$, are already disclosed in the documents U.S. Pat. No. 4,835,121 and US 2002/0022564. However, these vitroceramics are not transparent in the infrared for wavelengths greater than at most 4 μm, which is inadequate for a great many applications.

Finally, there also exist ceramics, transparent to infrared radiation, based on ZnS or ZnSe nanocrystals. Unfortunately, the preparation and the forming of these ceramics are complex.

Consequently, there remains to this day a need for a material which makes it possible to simultaneously satisfy all the abovementioned requirements, namely transparency in the infrared, in particular in the wavelengths between 0.7 and 14 μm, low cost and good thermal/mechanical properties.

Surprisingly, the inventors have discovered that it is possible to obtain vitroceramics of chalcogenide type which exhibit transparency in the infrared.

More specifically, the invention relates mainly to a composition of vitroceramic type comprising, in mol %:

|         |       |
|---------|-------|
| Ge      | 5-40  |
| Ga      | <1    |
| S + Se  | 40-85 |
| Sb + As | 4-40  |
| MX      | 2-25  |
| Ln      | 0-6   |
| Adjuvant | 0-30 | in which:

M represents at least one alkali metal chosen in particular from Rb, Cs, Na, K and Zn, X represents at least one chlorine, bromine or iodine atom, Ln represents at least one rare earth metal, and Adjuvant represents at least one additive composed of at least one metal and/or at least one metal salt, with the sum of the combination of the molar percentages of the components present in said composition being equal to 100.

According to a specific alternative form, the content of antimony and/or arsenic can vary from 5 to 40 mol %.

According to a favored alternative form of the invention, this composition is a vitroceramic which is transparent in the infrared, in particular in the wavelengths extending from 0.7 to 14 μm and especially extending from 0.7 to 11 μm or from 0.9 to 14 μm. To be specific, the transparency of these vitroceramic compositions can in particular be adjusted, according in particular to the nature of their components, to one of the ranges extending from 0.7 to 11 μm or from 0.9 to 14 μm.

Advantageously, the vitroceramic compositions according to the invention thus prove to be transparent in the operating ranges commonly selected for thermal imagers, that is to say the ranges of wavelengths extending from 3 to 5 μm and from 8 to 12 μm.

In some cases, optical losses due to the crystals present in the composition may be recorded in the short wavelengths typically extending from 0.6 to 2 μm. However, they have no significant effect in the ranges of wavelengths extending from 3 to 5 μm and from 8 to 12 μm.

Said vitroceramic compositions according to the invention can be obtained by specific heat treatment of vitreous compositions with the same composition but devoid of crystals, also referred to as "noncrystalline".

Within the meaning of the present invention, a vitreous composition is regarded as noncrystalline from the moment when it does not diffract X-rays and when observation under an electron microscope does not reveal crystals.

These vitreous compositions, i.e. noncrystalline compositions, constitute another subject matter of the invention. Due to their composition, they advantageously make it possible to obtain, via an appropriate heat treatment, nucleation and crystalline growth which are controlled so as to be compatible with an application in infrared and to confer the expected mechanical and thermal properties on the corresponding vitroceramic compositions.

Thus, the appropriate heat treatment applied to these vitreous compositions is such that it makes it possible to generate crystals, observable under an electron microscope, with a size of less than 1 μm in the vitroceramic thus obtained.

These crystals generally have a size of less than 1 μm, in particular of less than or equal to 500 nm, especially of less than or equal to 400 nm, indeed even of less than or equal to 300 nm.

They can exhibit a size of greater than or equal to 1 nm, in particular of greater than or equal to 2 nm, especially of greater than or equal to 5 nm, indeed even of greater than or equal to 10 nm.

More particularly, these crystals exhibit a size varying from 10 to 300 nm and in particular from 50 to 300 nm.

The size and the distribution of the crystals can be observed by observation with an electron microscope.

In particular, the chalcogenide vitroceramics according to the invention can comprise at least 0.1% of crystallized volume with crystals with a size of less than or equal to 1 μm and in particular of less than or equal to 400 μm. However, it is clear that this amount by volume of crystals can be adjusted and in particular increased, according to the applications envisaged. By way of example, for optical amplification, 0.1% of crystallized rare earth metal ions may be more than sufficient. On the other hand, a level of crystallized volume of greater than 10%, 40%, indeed even more, will for its part be more particularly advantageous in reducing the coefficent of expansion of a composite material.

These values of percentage of crystallized volume can be observed by observation under an electron microscope.

According to a specific alternative form, the compositions according to the invention comprise gallium in a content of less than or equal to 0.75 mol %, in particular in a content of less than or equal to 0.5 mol %, especially in a content of less than or equal to 0.25 mol %, indeed even in a content of less than or equal to 0.1 mol %.

More particularly, the compositions according to the invention are devoid of gallium. The term "devoid of gallium" is understood to mean a content at most equal to the content of gallium present as impurity in the other components.

The compositions according to the invention comprise germanium in a content which can in particular vary from 10 to 35 mol %.

Likewise, they comprise sulfur and/or selenium in a content which can vary in particular from 45 to 75 mol % and especially from 50 to 75 mol %.

The compositions according to the invention comprise antimony and/or arsenic in a content which can vary in particular from 4 to 25 mol % and especially from 8 to 20 mol %.

As regards the compound MX, it is chosen more particularly from CsCl, CsBr, CsI, NaCl, NaBr, NaI, KCl, KBr, KI, RbCl, RbBr, RbI, $ZnCl_2$, $ZnBr_2$ and $ZnI_2$ and in particular from $ZnCl_2$, CsCl, CsBr, CsI and their mixtures. This compound MX is generally present in a content varying in particular from 2 to 15 mol %.

As regards the rare earth metal component, Ln, of the composition according to the invention, it can be chosen more particularly from Dy, Er, Nd, Pr, Yb, Tm, Ho and their mixtures. It is generally present in a content varying in particular from 0 to 3 mol %.

Of course, the compositions according to the invention are capable of comprising one or more adjuvants. As specified above, the adjuvant can be a metal, a metal salt or their mixtures.

According to a specific alternative form of the invention, these adjuvants can be chosen from calcium, barium, indium, tellurium, silver, copper, lead, cadmium, their salts, such as, for example, $PbI_2$ or CuI, and their derivatives, such as, for example, $Ag_2Se$ and CdTe, and their mixtures.

These adjuvants are generally present in particular in a proportion of from 0 to 10 mol %.

According to a specific alternative form, the compositions according to the invention are a quaternary mixture of germanium in a content varying from 15 to 30 mol %, of antimony in a content varying from 4 to 20 mol %, of selenium in a content varying from 50 to 70 mol % and of cesium halide, such as CsCl, CsBr or CsI, in a content varying from 3 to 15 mol %.

According to another specific alternative form, the compositions according to the invention are a quaternary mixture of germanium in a content varying from 15 to 20 mol %, of antimony in a content varying from 10 to 15 mol %, of sulfur in a content varying from 45 to 65 mol % and of cesium halide, such as CsCl, CsBr or CsI, in a content varying from 2 to 15 mol %.

According to yet another specific alternative form, the compositions according to the invention are a five-component mixture of germanium in a content extending from 10 to 25 mol %, of antimony in a content extending from 10 to 25 mol %, of selenium in a content extending from 55 to 65 mol %, of cesium halide, such as CsCl, CsBr or CsI, in a content extending from 2 to 5 mol % and of an adjuvant chosen from $PbI_2$, CuI, $Ag_2Se$ and CdTe in a content extending from 1 to 7 mol %.

As specified above, the vitroceramic composition can be obtained as the result of a heat treatment of a vitreous composition according to the invention. This heat treatment can last from one hour to one month, indeed even more, and has to be carried out at a temperature greater than the glass transition temperature (Tg) of the vitreous composition, so as to generate crystals compatible in number and in size with transparency in the infrared, particularly in the wavelengths extending from 0.7 to 14 µm and in particular extending from 0.7 to 11 µm or from 0.9 to 14 µm.

As regards these noncrystalline vitreous (or nonvitro-ceramic) compositions according to the invention, they can be obtained by a preparation process comprising in particular the stages consisting in:

introducing the germanium, the gallium, the sulfur and/or the selenium, the antimony and/or the arsenic, Ln and the adjuvant, in the desired proportions, into a tube of silica, in particular, pumping under vacuum, for example down to $10^{-4}$ mbar, and sealing said tubes of silica, bringing said tubes to temperatures varying from 700 to 1000° C., homogenizing the mixture at this temperature for a period of time of between 1 and 10 hours, rapidly cooling down to a temperature from 20 to 30° C. below the glass transition temperature of said mixture, and slowly cooling said mixture down to ambient temperature.

This process for the manufacture of the vitreous composition according to the invention can additionally comprise a purification stage consisting in adding at most 500 ppm of at least one oxygen scavenger, such as, for example, aluminum, magnesium or their mixtures, before vacuum distillation of said vitreous composition.

The vitroceramics according to the invention can be used in an infrared system and in particular for manufacturing optics for any infrared system operating in particular from 0.7 to 14 µm and especially extending from 0.7 to 11 µm or from 0.9 to 14 µm, and especially from 3 to 5 µm and/or from 8 to 12 µm. In the case where they comprise rare earth metals, they can also be used for optical amplification.

FIGURE

FIG. 1 is a photograph at a magnification×20 000 of the chalcogenide vitroceramic having the composition described in example 3.

The following examples are given by way of illustration and in no way of limitation of the invention.

EXAMPLES

Examples 1 to 47 presented below report 47 compositions of vitroceramic type in accordance with the invention.

By carrying out the operation as indicated above, vitreous compositions having the compositions specified below are prepared in a first step.

For the manufacture of the corresponding vitroceramics, these vitreous compositions are heated up to a temperature greater than their glass transition temperature (Tg) for a more or less lengthy period depending on the size and on the amount of crystals desired.

By way of example, for the vitreous composition No. 3, with a Tg of 260° C., the annealing is carried out at 290° C. for a period of time typically varying from 1 hour to 1 month, which makes it possible to control the amount of crystals.

The vitroceramic thus obtained is illustrated by FIG. 1.

| Examples | Ge | Sb | Se | CsCl |
|---|---|---|---|---|
| 1 | 26.3 | 6.0 | 60.5 | 7.2 |
| 2 | 24.3 | 12.5 | 58.4 | 4.7 |
| 3 | 23.3 | 11.7 | 56 | 9.0 |
| 4 | 23.9 | 4.8 | 66.8 | 4.5 |
| 5 | 21.8 | 8.7 | 56.7 | 12.7 |
| 6 | 19.9 | 12.4 | 60.3 | 4.9 |

| Examples | Ge | Sb | Se | CsBr |
|---|---|---|---|---|
| 7 | 24.6 | 12.4 | 59.2 | 3.7 |
| 8 | 23.8 | 12.0 | 57.2 | 7 |
| 9 | 22.9 | 11.6 | 55.1 | 10.5 |
| 10 | 23.2 | 9.3 | 60.4 | 7.1 |
| 11 | 22.4 | 9.0 | 58.3 | 10.3 |
| 12 | 25.1 | 5.8 | 65.5 | 3.6 |
| 13 | 24.8 | 10.2 | 61.3 | 3.8 |

| Examples | Ge | Sb | Se | CsI |
|---|---|---|---|---|
| 14 | 24 | 12.4 | 57.5 | 6.0 |
| 15 | 23.3 | 11.8 | 56.1 | 8.8 |
| 16 | 24.6 | 5.6 | 64.0 | 5.8 |
| 17 | 22.8 | 9.1 | 59.4 | 8.6 |
| 18 | 24.8 | 10.8 | 61.4 | 3.1 |
| 19 | 19.9 | 16.3 | 60.7 | 3.1 |

| Examples | Ge | Sb | S | CsCl |
|---|---|---|---|---|
| 20 | 18.8 | 14.1 | 61.1 | 6 |
| 21 | 18.3 | 13.7 | 59.3 | 8.7 |
| 22 | 17.3 | 12.9 | 56.1 | 13.7 |
| 23 | 16.8 | 12.6 | 54.6 | 16 |

| Examples | Ge | Sb | S | CsBr |
|---|---|---|---|---|
| 24 | 19.5 | 14.6 | 63.4 | 2.5 |
| 25 | 18.6 | 13.9 | 60.4 | 7.0 |

| Examples | Ge | Sb | S | CsI |
|---|---|---|---|---|
| 26 | 19.2 | 14.4 | 62.4 | 4.0 |
| 27 | 18.5 | 13.9 | 60.0 | 7.6 |
| 28 | 16.0 | 12.0 | 52.1 | 6.6 |
| 29 | 15.4 | 11.5 | 49.9 | 6.3 |

| Examples | Ge | Sb | Se | PbI$_2$ | CsI |
|---|---|---|---|---|---|
| 30 | 21.9 | 12.9 | 60.3 | 2.5 | 2.4 |
| 31 | 15.1 | 18.3 | 58.3 | 6.2 | 2.1 |
| 32 | 17.1 | 17.2 | 60.9 | 2.8 | 2 |
| 33 | 13.4 | 20.9 | 60.9 | 2.7 | 2.1 |
| 34 | 20.2 | 14.3 | 61.8 | 1.5 | 2.2 |

| Examples | Ge | Sb | Se | CuI | CsBr |
|---|---|---|---|---|---|
| 35 | 19.3 | 12.9 | 59.7 | 6 | 2.1 |
| 36 | 21.2 | 11.8 | 61.6 | 3.1 | 2.3 |
| 37 | 16.2 | 17.3 | 60.1 | 4.2 | 2.2 |
| 38 | 11.8 | 23.2 | 60.5 | 2.5 | 2 |
| 39 | 17.4 | 15.8 | 59.2 | 5.1 | 2.5 |

| Examples | Ge | Sb | Se | Ag$_2$Se | CsCl |
|---|---|---|---|---|---|
| 40 | 16.2 | 18 | 60.3 | 3.5 | 2 |
| 41 | 21.2 | 12 | 61.7 | 3 | 2.1 |
| 42 | 12 | 22.6 | 60.9 | 2.5 | 2 |
| 43 | 21.7 | 13.2 | 60.5 | 2.4 | 2.2 |

| Examples | Ge | Sb | Se | CdTe | CsI |
|---|---|---|---|---|---|
| 44 | 16.8 | 17.9 | 61.2 | 2.1 | 2 |
| 45 | 21.5 | 12.1 | 61.2 | 3 | 2.2 |
| 46 | 19 | 15.7 | 61.9 | 1.4 | 2 |
| 47 | 17.3 | 17.1 | 61 | 2.5 | 2.1 |

The intervals should be understood as limits included, unless otherwise specified.

What is claimed is:

1. A composition of vitroceramic type comprising, in mol %:

| Ge | 5-40 |
|---|---|
| Ga | <1 |
| S + Se | 40-85 |
| Sb + As | 4-40 |
| MX | 2-25 |
| Ln | 0-6 |
| Adjuvant | 0-30 | in which:
  M represents at least one alkali metal chosen from Rb, Cs, Na, K and Zn,
  X represents at least one chlorine, bromine or iodine atom,
  Ln represents at least one rare earth metal, and
  Adjuvant represents at least one additive composed of at least one metal and/or at least one metal salt,
  with the sum of the combination of the molar percentages of the components present in said composition being equal to 100,
  wherein the composition is a quaternary mixture of germanium in a content varying from 15 to 130 mol %, of antimony in a content varying from 4 to 20 mol %, of selenium in a content varying from 50 to 70 mol % and of CsX, in a content varying from 3 to 15 mol %.

2. A composition of vitroceramic type comprising, in mol %:

| Ge | 5-40 |
|---|---|
| Ga | <1 |
| S + Se | 40-85 |
| Sb + As | 4-40 |
| MX | 2-25 |
| Ln | 0-6 |
| Adjuvant | 0-30 | in which:
  M represents at least one alkali metal chosen from Rb, Cs, Na, K and Zn,
  X represents at least one chlorine, bromine or iodine atom,
  Ln represents at least one rare earth metal, and
  Adjuvant represents at least one additive composed of at least one metal and/or at least one metal salt,
  with the sum of the combination of the molar percentages of the components present in said composition being equal to 100,
  wherein the composition is a quaternary mixture of germanium in a content varying from 15 to 20 mol %, of antimony in a content varying from 10 to 15 mol %, of sulfur in a content varying from 45 to 65 mol % and of CsX, in a content varying from 2 to 15 mol %.

3. A composition of vitroceramic type comprising, in mol %:

| | | |
|---|---|---|
| | Ge | 5-40 |
| | Ga | <1 |
| | S + Se | 40-85 |
| | Sb + As | 4-40 |
| | MX | 2-25 |
| | Ln | 0-6 |
| | Adjuvant | 0-30 | in which:
- M represents at least one alkali metal chosen from Rb, Cs, Na, K and Zn,
- X represents at least one chlorine, bromine or iodine atom,
- Ln represents at least one rare earth metal, and
- Adjuvant represents at least one additive composed of at least one metal and/or at least one metal salt,
- with the sum of the combination of the molar percentages of the components present in said composition being equal to 100,
- wherein the composition is a five-component mixture of germanium in a content extending from 10 to 25 mol %, of antimony in a content extending from 10 to 25 mol %, of selenium in a content extending from 55 to 65 mol %, of CsX, in a content extending from 2 to 5 mol % and of an adjuvant chosen from $PbI_2$, CuI, $Ag_2Se$ and CdTe in a content extending from 1 to 7 mol %.

4. A noncrystalline vitreous composition comprising, in mol %:

| | | |
|---|---|---|
| | Ge | 5-40 |
| | Ga | <1 |
| | S + Se | 40-85 |
| | Sb + As | 4-40 |
| | MX | 2-25 |
| | Ln | 0-6 |
| | Adjuvant | 0-30 | in which:
- M represents at least one alkali metal chosen from Rb, Cs, Na, K and Zn,
- X represents at least one chlorine, bromine or iodine atom,
- Ln represents at least one rare earth metal, and
- Adjuvant represents at least one additive composed of at least one metal and/or at least one metal salt,
- with the sum of the combination of the molar percentages of the components present in said composition being equal to 100,
- wherein the composition is a quaternary mixture of germanium in a content varying from 15 to 30 mol %, of antimony in a content varying from 4 to 20 mol %, of selenium in a content varying from 50 to 70 mol % and of CsX, in a content varying from 3 to 15 mol %.

5. A noncrystalline vitreous composition comprising, in mol %:

| | | |
|---|---|---|
| | Ge | 5-40 |
| | Ga | <1 |
| | S + Se | 40-85 |
| | Sb + As | 4-40 |
| | MX | 2-25 |
| | Ln | 0-6 |
| | Adjuvant | 0-30 | in which:
- M represents at least one alkali metal chosen from Rb, Cs, Na, K and Zn,
- X represents at least one chlorine, bromine or iodine atom,
- Ln represents at least one rare earth metal, and
- Adjuvant represents at least one additive composed of at least one metal and/or at least one metal salt,
- with the sum of the combination of the molar percentages of the components present in said composition being equal to 100,
- wherein the composition is a five-component mixture of germanium in a content extending from 10 to 25 mol %, of antimony in a content extending from 10 to 25 mol %, of selenium in a content extending from 55 to 65 mol %, of CsX, in a content extending from 2 to 5 mol % and of an adjuvant chosen from $PbI_2$, CuI, $Ag_2Se$ and CdTe in a content extending from 1 to 7 mol %.

6. The composition as claimed in claim 1, exhibiting a transparency in the infrared.

7. The composition as claimed in claim 1, comprising at least 0.1% of crystallized volume with crystals with a size of less than or equal to 1 μm.

8. The composition as claimed in claim 7, wherein the crystals have a mean size of less than or equal to 500 nm.

9. The composition as claimed in claim 7, wherein the crystals have a mean size of greater than or equal to 1 nm.

10. The composition as claimed in claim 7, wherein the crystals have a size varying from 10 to 300 nm.

11. A process for the preparation of a composition of vitroceramic type comprising the heat treatment of a vitreous composition as claimed in claim 4 at a temperature and for a period of time sufficient to produce crystals with a size of less than 1 μm.

12. An infrared system operating in a wavelength range extending from 0.7 to 14 μm and comprising an optical component, wherein the optical component has a composition of vitroceramic type as defined in claim 1.

13. The composition as claimed in claim 2, exhibiting a transparency in the infrared.

14. The composition as claimed in claim 2, comprising at least 0.1% of crystallized volume with crystals with a size of less than or equal to 1 μm.

15. The composition as claimed in claim 14, wherein the crystals have a mean size of less than or equal to 500 nm.

16. The composition as claimed in claim 14, wherein the crystals have a mean size of greater than or equal to 1 nm.

17. The composition as claimed in claim 14, wherein the crystals have a size varying from 10 to 300 nm.

18. An infrared system operating in a wavelength range extending from 0.7 to 14 μm and comprising an optical component, wherein the optical component has a composition of vitroceramic type as defined in claim 2.

19. The composition as claimed in claim 3, exhibiting a transparency in the infrared.

20. The composition as claimed in claim 3, comprising at least 0.1% of crystallized volume with crystals with a size of less than or equal to 1 μm.

21. The composition as claimed in claim 20, wherein the crystals have a mean size of less than or equal to 500 nm.

22. The composition as claimed in claim 20, wherein the crystals have a mean size of greater than or equal to 1 nm.

23. The composition as claimed in claim 20, wherein the crystals have a size varying from 10 to 300 nm.

24. An infrared system operating in a wavelength range extending from 0.7 to 14 μm and comprising an optical component, wherein the optical component has a composition of vitroceramic type as defined in claim 3.

25. A process for the preparation of a composition of vitroceramic type comprising the heat treatment of a vitreous composition as claimed in claim 5 at a temperature and for a period of time sufficient to produce crystals with a size of less than 1 μm.

\* \* \* \* \*